2 Sheets—Sheet 1.

S. STEWART.
MACHINE FOR RAKING AND COCKING HAY.

No. 103,100. Patented May 17, 1870.

2 Sheets—Sheet 2.

S. STEWART.
MACHINE FOR RAKING AND COCKING HAY.

No. 103,100. Patented May 17, 1870.

INVENTOR.
Scott Stewart,
by his Attorney,
Albert M. Moore.

WITNESSES.
Abel T. Atherton
John F. Frye

United States Patent Office.

SCOTT STEWART, OF LOWELL, MASSACHUSETTS.

Letters Patent No. 103,100, dated May 17, 1870.

---

IMPROVEMENT IN MACHINES FOR RAKING AND COCKING HAY.

---

The Schedule referred to in these Letters Patent and making part of the same.

---

I, SCOTT STEWART, of Lowell, in the county of Middlesex and State of Massachusetts, have invented certain Improvements in Horse-Rakes, of which the following is a specification.

My invention relates to the combination of hay-forks, horse-rake, and hay-receiver in such a manner that the said horse-rake shall be capable of gathering the hay in the field, and, assisted by the operation of the forks, transferring the hay to the receiver, forming thereby the hay into hay-cocks, which are deposited upon the field.

Figure 1:
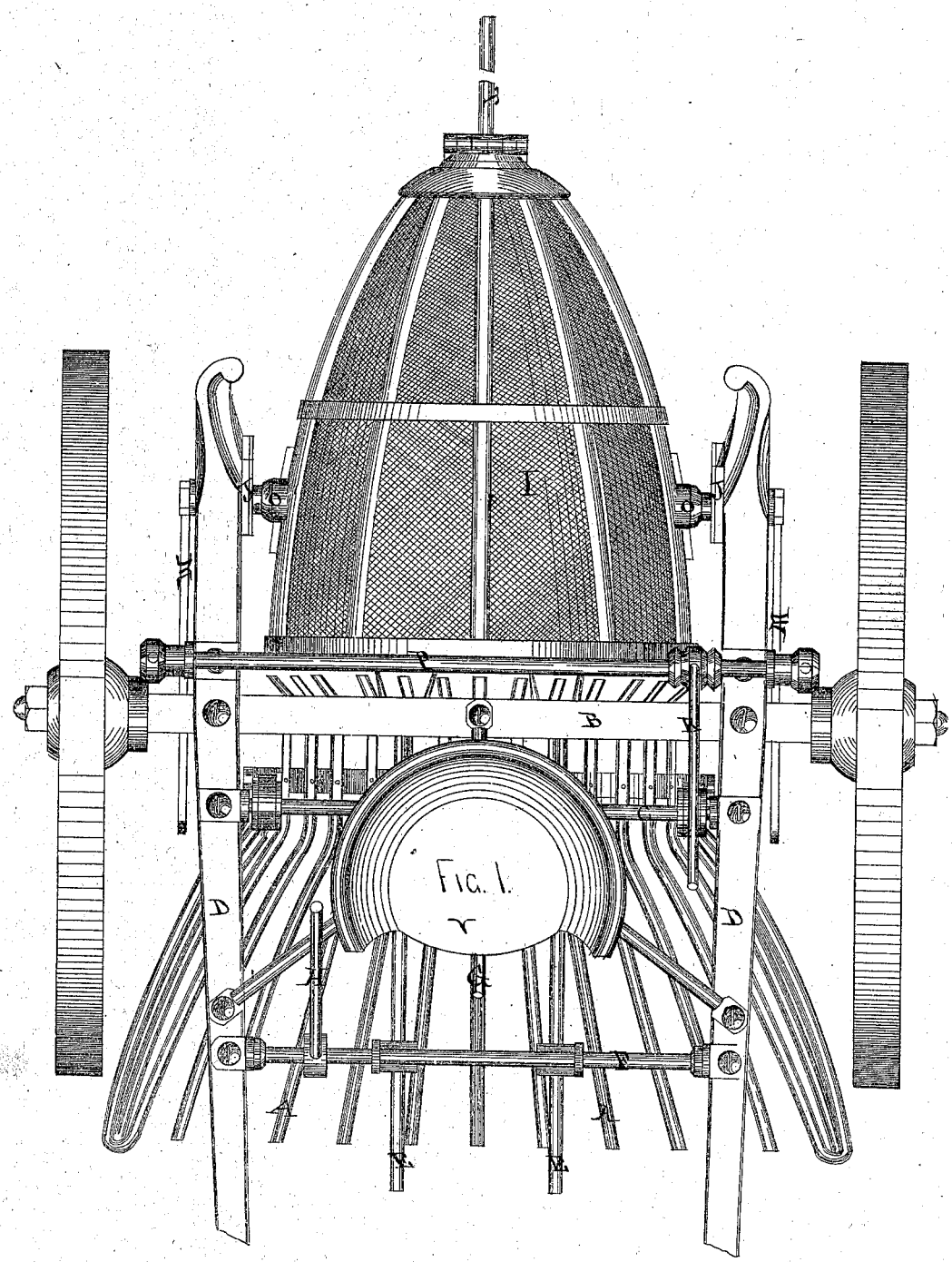

A A, Figure 1, is a rake hung on the axle B.

This rake is connected by leather bands or iron chains to shaft C, supported upon the thills D D.

E E are two forks connected by links to the shafts O F; said forks being to compress the hay in the receiver.

F is a shaft supported upon thills D D, and connected by links with forks E E.

G is a lever attached to shaft C for the purpose of elevating or depressing the rake A A.

H is a hand-lever connected with shaft F for the purpose of imparting a backward and forward motion to the forks E E.

I is a receiver, the frame of which is lined with canvas, or other suitable material.

Figure 2:
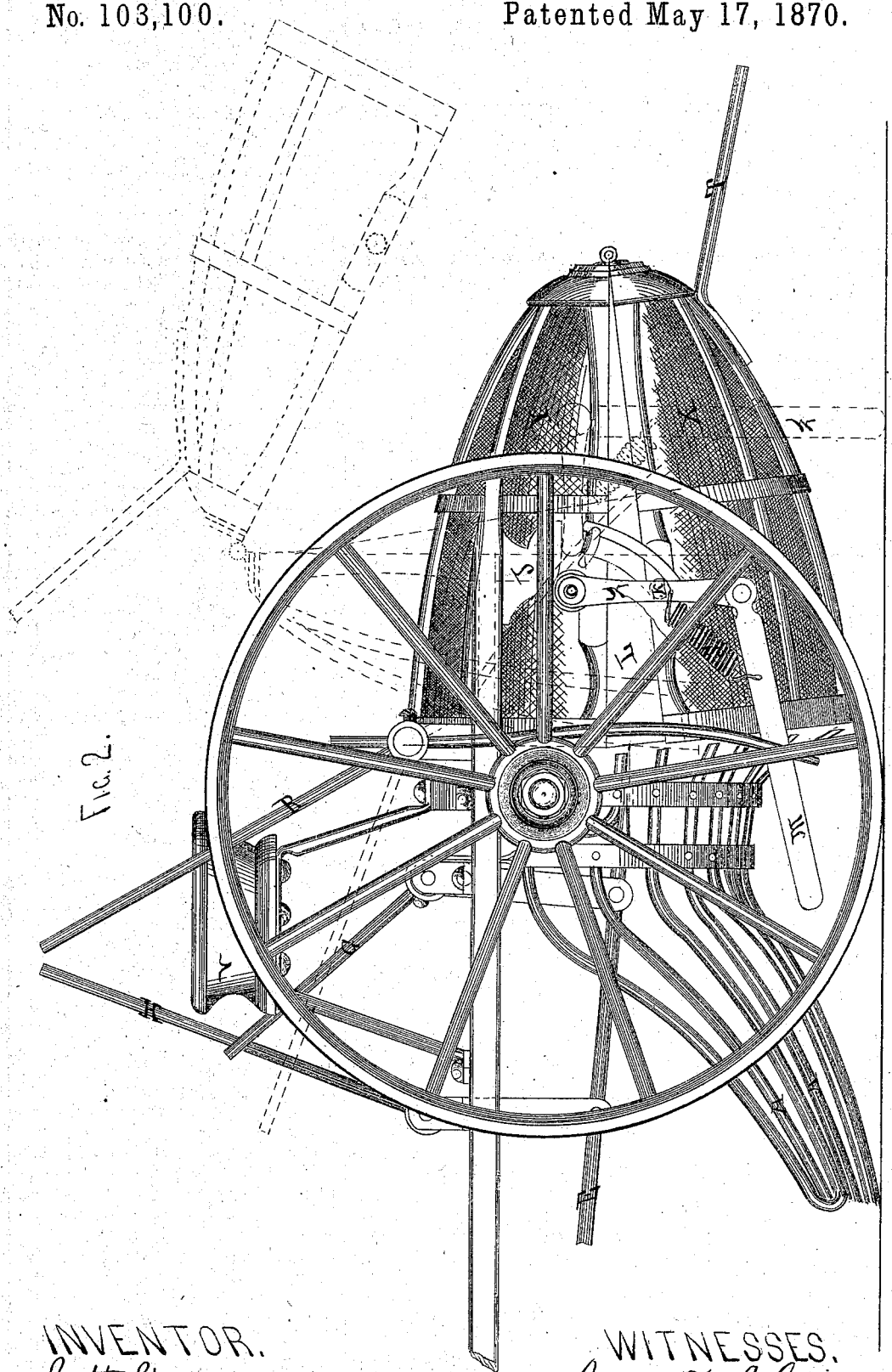

This receiver is formed in two equal parts, and connected together at the apex by a hinge, the division being a plane passing through the apex and the center of the base, as represented in Figure 2.

This receiver is connected to slotted plates J J, (fig. 1,) which are hung to the end of thills D D.

K (fig. 2) is one of two studs, which are alike, and disposed on opposite sides of the machine, fastened to the lower part of the receiver, (said lower part of the receiver being marked X,) and working in slots in slotted plates J J; the object of these studs, so working, being to close the two parts of the receiver, thus compressing the hay immediately before delivery from the receiver.

L (fig. 2) is one of two plates, which are alike, and disposed on opposite sides of the machine, made of thin iron, or other suitable material, and attached to the interior of the upper part of the receiver marked Y, at the lower edge of Y.

The object of these plates being to close the opening of the two parts of the receiver when the studs (one of which is marked K) are in the slots of the slotted plates, one of which is represented by T fig. 2.

M M are two levers, each connected at one end to levers, one of which is marked N, fig. 2.

N is one of two levers which are alike, and disposed on opposite sides of the machine, connected by a loose joint at one end to the lever M, and at the other end to the stud O.

O is one of two studs, which are alike, and disposed on opposite sides of the machine, attached to the upper part of the receiver, marked Y in fig. 2.

The object of M M is to communicate motion to the levers (one of which is marked N in fig. 2) by means of two forked levers, which are alike, and disposed on opposite sides of the machine, attached to each end of shaft P, one of which levers is shown in fig. 2.

R is a lever attached to shaft P, to operate the same.

The levers M M also operate for the purpose of supporting the receiver, by resting at one end upon the ground when the receiver is inverted. The position of one of the levers, when the receiver is inverted, is shown by the dotted lines, and marked W.

S is one of two spiral springs, which are alike, and disposed on opposite sides of the machine, attached to the lever M at the same point on each, the other end of each spring to levers at the same point on each, one of said levers being marked N in fig. 2.

The object of said springs being to cause the return of the levers M M after the discharge of the hay from the receiver to their position, as shown in fig. 2.

T is a hand-lever, either straight or curved forward toward the seat of the driver, and attached to X at its apex.

The object of said lever being to open the receiver after the discharge of the hay, thus preventing said receiver, when the machine advances, from overturning the hay-cock.

V is a seat for the accommodation of the operator of the machine.

When the machine is in operation a quantity of hay passes over the rake A A into the receiver I, and is then compressed by the operation of the forks E E, after which, by the continued operation of the machine, a sufficient quantity of hay is compressed within the receiver.

The next operation is to invert the receiver I, and cause the discharge of the hay in the form of a hay-cock upon the field; this result is accomplished by operating the lever R; after the discharge of the hay the receiver is then opened by means of the lever T, the position of the receiver when opened being represented by the dotted lines in fig. 2.

The receiver is sustained in the position represented by the dotted lines until a sufficient distance has intervened between the receiver and the hay-cock to allow the return of the receiver to its position for again receiving the hay, without danger of overturning the hay-cock by the closing together of the parts of the receiver.

I claim as my invention—

The combination of the rake A A, the forks E E, the slotted plates J J, the studs O O, the levers M M N, and the receiver I, substantially as described and for the purpose specified.

SCOTT STEWART.

Witnesses:
   I. HENRY PAIGE,
   CHARLES E. MARRINER.